United States Patent
Morikawa et al.

(10) Patent No.: US 9,686,363 B2
(45) Date of Patent: Jun. 20, 2017

(54) AIRCRAFT COMMUNICATION SYSTEM, AIRCRAFT COMMUNICATION METHOD, AND COMMUNICATION DEVICE

(71) Applicant: MITSUBISHI HEAVY INDUSTRIES, LTD., Minato-ku, Tokyo (JP)

(72) Inventors: Takahiro Morikawa, Tokyo (JP); Hikaru Takami, Tokyo (JP); Hidenobu Tsukagishi, Tokyo (JP); Ryosuke Yamaoka, Tokyo (JP); Hiroyuki Kakamu, Nagoya (JP); Akira Imada, Tokyo (JP); Terumasa Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 55 days.

(21) Appl. No.: 14/759,930

(22) PCT Filed: Dec. 10, 2013

(86) PCT No.: PCT/JP2013/083053
§ 371 (c)(1),
(2) Date: Jul. 9, 2015

(87) PCT Pub. No.: WO2014/112245
PCT Pub. Date: Jul. 24, 2014

(65) Prior Publication Data
US 2016/0028835 A1    Jan. 28, 2016

(30) Foreign Application Priority Data
Jan. 17, 2013  (JP) ................................ 2013-006482

(51) Int. Cl.
*G06F 11/00* (2006.01)
*H04L 29/08* (2006.01)
(Continued)

(52) U.S. Cl.
CPC .......... *H04L 67/16* (2013.01); *G06F 11/1004* (2013.01); *H04L 12/40189* (2013.01);
(Continued)

(58) Field of Classification Search
CPC ......... H04L 67/16; H04L 43/04; H04L 67/12; G06F 11/1004
See application file for complete search history.

(56) References Cited

U.S. PATENT DOCUMENTS 6,606,355 B1 * 8/2003 Wei ........................ H04B 14/04
                                                    370/523
7,719,970 B1 * 5/2010 Dada ................... H04L 12/4633
                                                    370/230
(Continued)

FOREIGN PATENT DOCUMENTS

JP       6-32291 A      2/1994
JP    2005-159769 A     6/2005
(Continued)

OTHER PUBLICATIONS

Written Opinion mailed Jan. 14, 2014, corresponding to International application No. PCT/JP2013/083053.
(Continued)

*Primary Examiner* — Esaw Abraham
(74) *Attorney, Agent, or Firm* — Hauptman Ham, LLP

(57) ABSTRACT

An aircraft communication system for performing communication between each of a plurality of devices installed in an aircraft, wherein the communication system is provided with a plurality of communication processing units provided corresponding to the plurality of devices and a plurality of communication lines for connecting between the communication processing units, the plurality of communication processing units being capable of bidirectional communication via the plurality of communication lines. Upon receiv- (Continued)

ing a plurality of communication data from the plurality of communication lines, one of the communication processing units determines, on the basis of identification information included in the received plurality of communication data, whether the received plurality of communication data needs to be acquired and acquires the communication data determined to need to be acquired.

12 Claims, 7 Drawing Sheets

(51) Int. Cl.
 *H04L 12/40* (2006.01)
 *G06F 11/10* (2006.01)
 *H04L 12/26* (2006.01)
(52) U.S. Cl.
 CPC .............. *H04L 43/04* (2013.01); *H04L 67/12* (2013.01); *H04L 2012/4028* (2013.01)

(56) References Cited

U.S. PATENT DOCUMENTS

| | | | | |
|---|---|---|---|---|
| 7,958,433 B1* | 6/2011 | Yoon | ................... | G06F 11/1048 711/173 |
| 8,484,540 B2* | 7/2013 | Nakagawa | ............ | H04L 1/0042 714/774 |
| 8,595,573 B2* | 11/2013 | Shalvi | ................ | G06F 11/1044 714/42 |
| 8,621,313 B2* | 12/2013 | Le Floch | ............ | H03M 13/353 714/752 |
| 8,725,969 B2* | 5/2014 | Hasegawa | ............. | G06F 3/0608 711/114 |
| 8,731,750 B2* | 5/2014 | Oster | ................. | H04B 7/18513 343/709 |
| 9,336,080 B2* | 5/2016 | Hirano | .................... | G06F 11/10 |

FOREIGN PATENT DOCUMENTS

| | | |
|---|---|---|
| JP | 2005-176444 A | 6/2005 |
| JP | 2008-160379 A | 7/2008 |
| JP | 2008-236408 A | 10/2008 |
| JP | 2008-306397 A | 12/2008 |
| JP | 2010-258990 A | 11/2010 |
| JP | 2010-260441 A | 11/2010 |

OTHER PUBLICATIONS

International Search Report issued on Jan. 14, 2014 in International Application No. PCT/JP2013/083053.
Extended European Search Report in EP Application No. 13871861.4, dated Aug. 3, 2016.
Ian Land and Jeff Elliott, "Architecting ARINC 664, Part 7 (AFDX) Solutions", May 22, 2009, pp. 1-25, Application Note: Virtex-4 and Virtex-5 FPGAS, No. version 1.0.1, XP007918728, Retrieved from URL: http://www.xilinx.com/support/documentation/application_notes/xapp1130.pdf.

\* cited by examiner

| Frame Type | Source ID | Path Redundant Level |
|---|---|---|
| 10 | 10 | 3 |
| | 11 | 1 |
| 11 | 20 | 2 |
| | 21 | 1 |

AIRCRAFT COMMUNICATION SYSTEM, AIRCRAFT COMMUNICATION METHOD, AND COMMUNICATION DEVICE

RELATED APPLICATIONS

The present application is a National Phase entry of International Application No. PCT/JP2013/083053, filed Dec. 10, 2013, which claims priority of Japanese Application No. 2013-006482, filed Jan. 17, 2013.

TECHNICAL FIELD

The present invention relates to an aircraft communication system, an aircraft communication method, and a communication device.

BACKGROUND ART

Conventionally, fly-by-wire flight control system is known as an aircraft communication system (for example, see PTL 1). This fly-by-wire flight control system has multi-redundant configuration in which three independent data buses are included in order to fly the aircraft safely. Various devices such as three primary flight computers and three actuator control electronics (ACEs) are connected to the three data buses, respectively.

CITATION LIST

Patent Literature

[PTL 1] Japanese Unexamined Patent Application

SUMMARY OF INVENTION

Technical Problem

Another communication system used in aircraft is, for example, an avionics full-duplex switched Ethernet (AFDX (registered trademark)). The AFDX has dual redundant configuration in which two data buses are included. In AFDX, various devices are connected to the two data buses, and are able to perform bidirectional communication (transmission and reception) via the respective data buses. When transmission and reception of the communication data are performed between the various devices using the AFDX, the communication data is transmitted and received using the two data buses. Thus, in the aircraft communication system as disclosed in PTL 1 or such as the AFDX, multi-redundancy is achieved.

Meanwhile, in a communication system, different degree of redundancy may be set depending on devices. That is, the communication system may have configuration in which dual redundancy and triple redundancy co-exist. In this case, the communication system is designed to be configured according to the redundancy of the devices. In this case, in the communication system described in PTL 1, from the fact that the various devices are connected to the data buses, there is a possibility that it is necessary to redesign the device itself according to the design of the communication system. Further, the AFDX can handle only dual redundancy, and thus, it is difficult to secure triple or more redundancy. Therefore, devices may be affected by the design of communication system, and it is difficult to design a communication system suitable to the redundancy.

Therefore, objective of the present invention is to provide an aircraft communication system, an aircraft communication method, and a communication device, capable of achieving multi-redundancy and easily applicable to a design of a communication system while securing reliable transmission and reception of communication data.

Solution to Problem

An aircraft communication system of the present invention is an aircraft communication system that performs communication between respective devices of an aircraft on which a plurality of devices are mounted, the aircraft communication system including: a plurality of communication processing units provided corresponding to the plurality of devices; and a plurality of communication lines connecting between the respective communication processing units, in which the plurality of communication processing units are able to perform bidirectional communication via the plurality of communication lines, and when the communication processing unit receives a plurality of pieces of communication data from the plurality of communication lines, the communication processing unit determines whether the plurality of pieces of received communication data are to be acquired based on identification information included in the plurality of pieces of received communication data, and acquires the communication data determined to be acquired.

According to this configuration, the communication processing unit can acquire necessary communication data among the plurality of pieces of the received communication data based on the identification information included in the communication data. In this case, redundancy is realized between the communication processing units by the plurality of communication lines, and highly reliable communication data is acquired from among the plurality of pieces of the communication data, and thus, it is possible to secure the reliability of the communication data. Further, since the communication line is appropriately provided according to the degree of redundancy set in the device, and the communication line and the communication processing unit may be appropriately connected, it is possible to easily cope with the set degree of redundancy without affecting the device.

In this case, it is preferable that the communication data includes a sequence number that is information regarding order of the communication data, and the communication processing unit determines whether each piece of communication data is newer than previously received communication data based on the sequence number included in the received communication data, and acquires the communication data determined to be new.

According to this configuration, the communication processing unit can acquire new communication data. Therefore, the communication processing unit can transmit the new acquired communication data to the device, and thus, the device can perform control based on the new communication data.

In this case, it is preferable that, when the communication processing unit receives a plurality of pieces of the communication data determined to be newer than the previously received communication data, the communication processing unit acquires the first received communication data.

According to this configuration, the communication processing unit can acquire the first received communication data among the plurality of pieces of the communication data determined to be new. Therefore, since the communication processing unit can transmit the first received communication data to the device, the device can execute the control more rapidly based on the communication data.

In this case, it is preferable that the identification information included in the communication data or configuration data for reception stored in the communication processing unit includes communication line identification information in which the communication data and the communication line are associated with each other, and when there is communication data determined to be erroneous, the communication processing unit detects that the communication line associated with the communication data determined to be erroneous is abnormal based on the communication line identification information.

According to this configuration, the communication processing unit can detect the abnormality of the communication line based on the communication line identification information. Therefore, it is possible to rapidly take appropriate measures for the communication line detected to be abnormal. Further, the configuration data for reception is data set in advance (configuration data) in order to acquire predetermined communication data from among the plurality of pieces of the received communication data.

In this case, it is preferable that the communication data or configuration data for reception stored in the communication processing unit includes information regarding set reception status in which reception status from the plurality of communication lines used for communication of the communication data has been set in advance, and when the set reception status and actual reception status of the communication data from the plurality of communication lines are different, the communication processing unit detects that there is abnormality.

According to this configuration, if the set reception status is different from the actual reception status, the communication processing unit can detect that there is abnormality in any one of the plurality of communication lines. More specifically, the reception status is the number of reception paths via which the communication data is received from the plurality of communication lines, and when the actual number of reception paths is smaller than the set number of reception paths, the communication processing unit detects that there is abnormality in any one of the plurality of communication paths. Therefore, it is possible to rapidly take appropriate measures to solve the abnormality of the communication system. Further, the reception status is not limited to the number of reception paths.

In this case, it is preferable that the communication data includes an error detection code for detecting whether the communication data has been destroyed, and the communication processing unit determines whether the plurality of received pieces of communication data have been destroyed based on the error detection code included in the plurality of pieces of the received communication data, and acquires the communication data determined not to have been destroyed.

According to this configuration, the communication processing unit can acquire the communication data that has not been destroyed. Therefore, the communication processing unit transmits the acquired non-destroyed communication data to the device, and thus, the device can accurately execute control based on the communication data. Further, the error detection code includes, for example, a cyclic redundancy check (CRC).

In this case, it is preferable that, when the communication processing unit receives device status data that is data regarding status of the device from the corresponding device, the communication processing unit generates a plurality of pieces of the communication data including the identification information corresponding to the plurality of communication lines based on the received device status data, and transmits the plurality of generated pieces of the communication data to the plurality of communication lines.

According to this configuration, the communication processing unit can transmit the plurality of pieces of the communication data to the plurality of communication lines. Therefore, the communication processing unit can transmit the device status data of the corresponding device to another communication processing unit.

In this case, it is preferable that the communication data or the configuration data for reception stored in the communication processing unit includes information regarding a survival period of the communication data, and when the communication processing unit or the device connected to the communication processing unit does not acquire the communication data within the survival period, the communication processing unit or the device detects that there is abnormality.

According to this configuration, when the communication processing unit or the device does not acquire the communication data within the survival period, the communication processing unit or the device can detect abnormality. Therefore, it is possible to rapidly take appropriate measures to solve the abnormality of the communication system.

In this case, it is preferable for the communication processing unit to be provided in the device.

According to this configuration, the processing unit provided in the device can function as the communication processing unit. That is, software capable of causing the processing unit to function as the communication processing unit is executed by the processing unit of the device, and thus, the processing unit can be realized as the communication processing unit.

In this case, it is preferable for the communication processing unit to be provided in a separate communication device to be connected to the device.

According to the configuration of this embodiment, since the device and the communication processing unit can be separate, it is possible to clearly isolate the configuration of the device and the configuration of the communication system. Further, since the communication device can be configured as a dedicated communication device of the communication processing unit, it is possible to improve processing speed of the communication.

An aircraft communication method of the present invention is an aircraft communication method using a communication system that performs communication between respective devices of an aircraft on which a plurality of devices are mounted, in which the communication system includes a plurality of communication processing units provided corresponding to the plurality of devices; and a plurality of communication lines connecting between the respective communication processing units, and the plurality of communication processing units are able to perform bidirectional communication via the plurality of communication lines, and the aircraft communication method includes: a reception process of receiving, by the communication processing unit, a plurality of pieces of communication data from the other communication processing unit via the plurality of communication lines; an acquisition determination process of determining, by the communication processing unit, whether the plurality of pieces of received communication data are to be acquired based on identification information included in the plurality of pieces of received communication data; and a data acquisition process of acquiring, by the communication processing unit, the communication data determined to be acquired.

According to this configuration, the communication processing unit can receive a plurality of pieces of the communication data in the reception process, the communication processing unit can determine whether each piece of communication data is to be acquired in the acquisition determination process, and the communication processing unit can acquire the necessary communication data in the data acquisition process. In this case, redundancy is realized between the communication processing units by the plurality of communication lines, and highly reliable communication data is acquired from among the plurality of pieces of the communication data, and thus, it is possible to secure the reliability of the communication data. Further, since the communication line is appropriately provided according to the degree of redundancy set in the device, and the communication line and the communication processing unit may be appropriately connected, it is possible to easily cope with the set degree of redundancy without affecting the device.

A communication device of the present invention is a communication device provided in a communication system that performs communication between respective devices of an aircraft on which a plurality of devices are mounted, the communication device including: a plurality of transmission and reception units to which a plurality of communication lines are connected and that are able to bidirectionally transmit and receive communication data between the plurality of communication lines; and a communication processing unit connected to the plurality of transmission and reception units, and processing the communication data, in which when the communication processing unit receives a plurality of pieces of the communication data from the plurality of communication lines via the plurality of transmission and reception units, the communication processing unit determines whether the plurality of pieces of received communication data are to be acquired based on identification information included in the plurality of pieces of received communication data, and acquires the communication data determined to be acquired.

According to this configuration, since a separate communication device can be connected to a device to configure the communication system, it is possible to clearly isolate the configuration of the device and the configuration of the communication system. Further, since the communication device can be configured as a dedicated communication device for the communication processing unit, it is possible to improve processing speed of the communication.

DESCRIPTION OF EMBODIMENTS

Hereinafter, embodiments according to the present invention will be described in detail with reference to the drawings. Further, the present invention is not limited to the embodiments. Further, components in the embodiments below include simple components that can be easily replaced by those skilled in the art, or substantially the same components.

Embodiments

Figure 1:
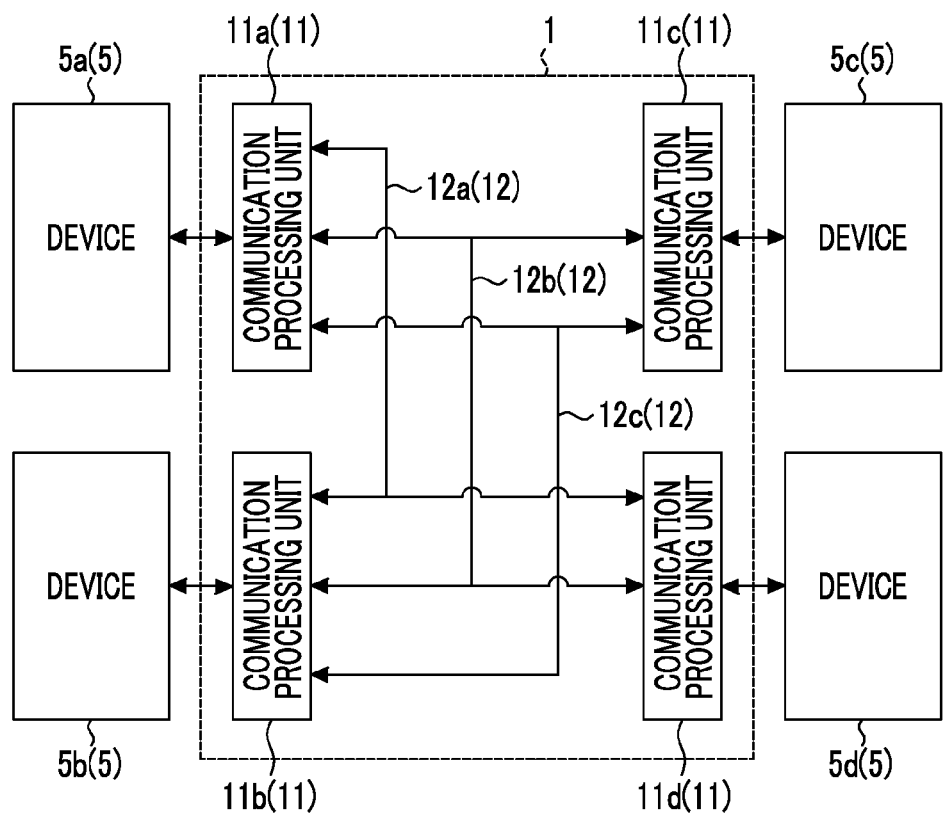
FIG. 1 is a conceptual diagram illustrating a conceptual configuration of an aircraft communication system according to the present embodiment.

FIG. 1 is a conceptual configuration diagram illustrating a conceptual configuration of an aircraft communication system according to the present embodiment. A plurality of devices 5 are mounted on an aircraft, and a communication system 1 communicates with each device 5 mounted on the aircraft. The communication system 1 has a redundant configuration in order to realize safe flight of the aircraft. First, a conceptual configuration of the communication system 1 of the aircraft will be described with reference to FIG. 1.

The communication system 1 includes a plurality of communication processing units 11 provided corresponding to the plurality of devices 5, and a plurality of communication lines 12 that connect the respective communication processing units 11. The communication system 1 has a configuration in which the communication data D is transmitted and received from the communication processing unit 11 to the other communication processing unit 11 via the plurality of communication lines 12, and bidirectional communication is possible between the respective communication processing units 11. Thus, the communication system 1 has a simple master-less configuration in which a master server is not provided. Accordingly, analysis of failure of the master server is unnecessary in this configuration.

Here, as illustrated in FIG. 1, the plurality of devices 5 mounted on the aircraft are configured to have different degrees of redundancy. Specifically, in the device 5a shown on an upper left side and the device 5b shown on the lower left side among the four devices 5a, 5b, 5c, and 5d, the degree of redundancy is set to be triple redundancy, and in the device 5c shown on an upper right side and the device 5d shown on the lower right side, the degree of redundancy is set to be dual redundancy.

The plurality of communication processing units 11 are connected to the plurality of corresponding devices 5, respectively, and have a redundancy corresponding to the redundancy of the devices 5 to which the communication processing units 11 are connected. Here, for the plurality of communication processing units 11, four communication processing units 11 are provided corresponding to the four devices 5a, 5b, 5c, and 5d. The communication processing unit 11a corresponding to the device 5a has a configuration in which triple redundancy is possible, that is, three communication lines 12 are connectable. Similarly, the communication processing unit 11b corresponding to the device 5b has a configuration in which triple redundancy is possible, that is, three communication lines 12 are connectable. Meanwhile, the communication processing unit 11c corresponding to the device 5c has a configuration in which dual redundancy is possible, that is, two communication lines 12 are connectable. Similarly, the communication processing unit 11d corresponding to the device 5d has a configuration in which dual redundancy is possible, that is, two communication lines 12 are connectable.

Each communication processing unit 11 performs a process for generating a plurality of pieces of the communication data D to be transmitted to the plurality of communication lines 12 to be connected thereto. Further, the communication processing unit 11 processes the plurality of pieces of the communication data D received from the plurality of communication lines 12 to be connected thereto. Further, in FIG. 1, while the communication processing unit 11 has a separate configuration to be connected to the device 5, the communication processing unit 11 may have a configuration provided inside the device 5. That is, the communication processing unit 11 may be provided inside a communication device connected to the device 5, or a processing unit provided inside the device 5 may function as the communication processing unit 11.

The plurality of communication lines 12 are provided corresponding to the degree of redundancy in the communication system 1. That is, for the plurality of communication lines 12, three communication lines 12 are provided which correspond to maximum redundancy in the communication system 1 and, in this embodiment, a maximum of triple redundancy. Each communication line 12 connects the plurality of communication processing units 11. Specifically, all the communication lines 12a, 12b, and 12c among the three communication lines 12a, 12b, and 12c are connected to the communication processing unit 11a and the communication processing unit 11b. On the other hand, any two communication lines 12 among the three communication lines 12a, 12b, and 12c are connected to the communication processing unit 11c and the communication processing unit 11d. That is, the communication line 12b is connected to the four communication processing units 11a, 11b, 11c, and 11d. Further, the communication line 12a is connected to three communication processing units 11a, 11b, and 11d among the four communication processing units 11a, 11b, 11c, and 11d. Further, the communication line 12c is connected to the three communication processing units 11a, 11b, and 11c among the four communication processing units 11a, 11b, 11c, and 11d. In the plurality of communication lines 12, priority such as a main and sub are not specifically set, but may be appropriately set.

Thus, in the above-described communication system 1, the communication processing unit 11 is able to receive a plurality of pieces of the communication data D transmitted from the other communication processing unit 11 via the plurality of connected communication lines 12. The communication processing unit 11 is able to transmit a plurality of pieces of the communication data D to the other communication processing unit 11 via the plurality of connected communication lines 12. Thus, the communication system 1 performs bidirectional communication between the respective communication processing units 11.

Figure 2:
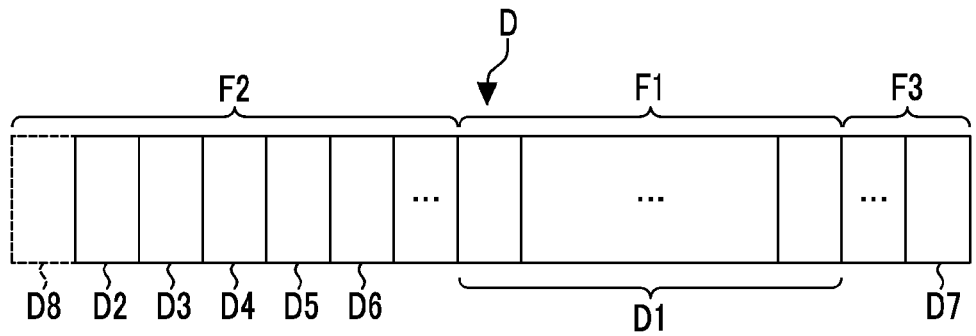
FIG. 2 is an illustrative diagram regarding a frame format of communication data.

Next, the communication data D used in the communication system 1 will be described with reference to FIG. 2. FIG. 2 is an illustrative diagram of a frame format of the communication data. The communication data D has a frame format including at least device status data D1 and a data link layer (second layer) to be described below. The communication data D may also include a network layer (third layer), and a transport layer (fourth layer). This communication data D includes a data field F1, a field F2 on the header side of the data field F1, and a field F3 on the footer side of the data field F1.

The device status data D1 is stored in the data field F1. The device status data D1 is data regarding a status of the device 5 connected to the communication processing unit 11, which is transmitted from the device 5, and is data that is shared among the plurality of communication processing units 11.

A standard identifier D2 for identifying a communication standard, a data type identifier D3 for identifying a type of the communication data D, and a transmission source device identifier D4 for identifying the device 5 that is a transmission source are stored as identification information in the field F2. Further, a sequence number D5 that is information regarding order of the communication data D, a previously designated survival period D6, and the like are stored in the field F2. Further, while in the present embodiment, the survival period D6 is included in the communication data D, the survival period D6 may be stored in configuration data for reception T, which will be described below.

An error detection code D7 for checking whether the communication data D is missing is stored in the field F3. The error detection code D7 includes, for example, FCS.

Further, information regarding the network layer (third layer) and the transport layer (fourth layer) may be included in the field F2 and the field F3. Further, the information stored in the field F2 and the field F3 is not limited to the above-described information. For example, a communication line identifier D8 (indicated by a dotted line) for identifying the communication line 12 may be included as the identification information. Further, a flag as a variable, status of the communication data D, or the like may be included as the identification information.

Here, as described above, the communication processing unit 11 transmits a plurality of pieces of the communication data D to the other communication processing unit 11 via a plurality of communication lines 12 to be connected to the communication processing unit 11. Further, the other communication processing unit 11 receives the plurality of pieces of the communication data D transmitted from the communication processing unit 11 via the plurality of communication lines 12 to be connected to the other communication processing unit 11. That is, the communication system 1 has a publishing and subscribing communication standard in which the communication processing unit 11 is a publishing side, and the other communication processing unit 11 is a subscribing side.

The standard identifier D2 is represented by "Protocol Identification", and an identifier for identifying the communication standard is set. Specifically, an identifier regarding the publishing and subscribe communication standard is set. The data type identifier D3 is represented by "Frame Type", and an identifier corresponding to the type of the device 5 is set. For example, if the device 5 is a speedometer, the type of the communication data D is speed data, and thus, an identifier for identifying the speed data is set in the data type identifier D3. The transmission source device identifier D4 is represented by "Source ID", and is an ID specific to the device 5. The sequence number D5 is represented by the "Sequence Num", and is counted up after each transmission of the communication data D. The survival period D6 is referred to as "Limit of Period", and when a previously designated survival period D6 elapses, the communication data D is discarded. The error detection code D7 is represented by "FCS", and is a code for detecting an error such as destruction and missing of data.

Next, a communication process of the communication processing unit 11 in the communication system 1 will be described. In the communication system 1 of a publishing and subscribing type, the communication data D is transmitted and received in an asynchronous manner. Also, each communication processing unit 11 appropriately functions as a transmitting side (publishing side) and a receiving side (subscription side). When the communication processing unit 11 functions as the transmitting side that transmits a plurality of pieces of the communication data D to the plurality of communication lines 12, the communication processing unit 11 generates a plurality of pieces of the communication data D illustrated in FIG. 2 according to a plurality of communication lines 12 to be connected to the communication processing unit 11. Also, the communication processing unit 11 transmits the plurality of pieces of generated communication data D to the plurality of communication lines 12.

Meanwhile, when the communication processing unit 11 functions as the receiving side that receives the plurality of pieces of the communication data D from the plurality of communication lines 12, the communication processing unit 11 determines whether the plurality of pieces of received communication data D is to be acquired, and acquires predetermined communication data D. Also, the communication processing unit 11 stores the acquired predetermined communication data D while updating the predetermined communication data D at a predetermined update period. Further, the stored communication data D is sent in response to a request from each device 5.

Here, a communication process (transmission process) when the communication processing unit 11 functions as a transmitting side will first be described. Predetermined data including device status data D1 is transmitted from the connected device 5 to the communication processing unit 11. When the communication processing unit 11 acquires the predetermined data including the device status data D1 from the connected device 5, the communication processing unit 11 stores, in the data field F1, the device status data D1 included in the data, and adds the above-described predetermined information to the field F2 and the field F3 to generate the communication data D illustrated in FIG. 2. In this case, the communication processing unit 11 generates a plurality of pieces of the communication data D according to the plurality of connected communication lines 12. Also, the communication processing unit 11 transmits the plurality of pieces of generated communication data D to the plurality of communication lines 12. The communication processing unit 11 repeatedly performs such a transmission process at a predetermined period.

Next, a communication process (reception process) when the communication processing unit 11 functions as a receiving side will be described. The plurality of pieces of the communication data D generated by the other communication processing unit 11 are transmitted to the communication processing unit 11 via the plurality of connected communication lines 12. The communication processing unit 11 selects communication data D from among the plurality of pieces of transmitted communication data D based on the configuration data for reception T illustrated in FIG. 3 to acquire the predetermined communication data D.

Figure 3:
FIG. 3 is an illustrative diagram of configuration data for reception.

FIG. 3 is an illustrative diagram of the configuration data for reception. As illustrated in FIG. 3, the configuration data for reception T is stored (saved) in the plurality of respective communication processing units 11. The configuration data for reception T includes a table in which the data type identifier (Frame Type) D3, the transmission source device identifier (Source ID) D4, and the number of reception paths (Path Redundant Level) are associated. Here, the number of reception paths is the number of receptions of the communication data D to be received at an update period for the communication data D, and indicates an aspect of the reception status. The configuration data for reception T illustrated in FIG. 3 is set, for example, so that the data type identifier D3 "10", the transmission source device identifier D4 "10", and the number of reception paths "3" are associated. Further, the configuration data for reception T is set, for example, so that the data type identifier D3 "10", the transmission source device identifier D4 "11", and the number of reception paths "1" are associated. Further, the configuration data for reception T is set, for example, so that the data type identifier D3 "11", the transmission source device identifier D4 "20", and the number of reception paths "2" are associated. Further, the configuration data for reception T is set, for example, so that the data type identifier D3 "11", the transmission source device identifier D4 "21", and the number of reception paths "1" are associated.

Figure 4:
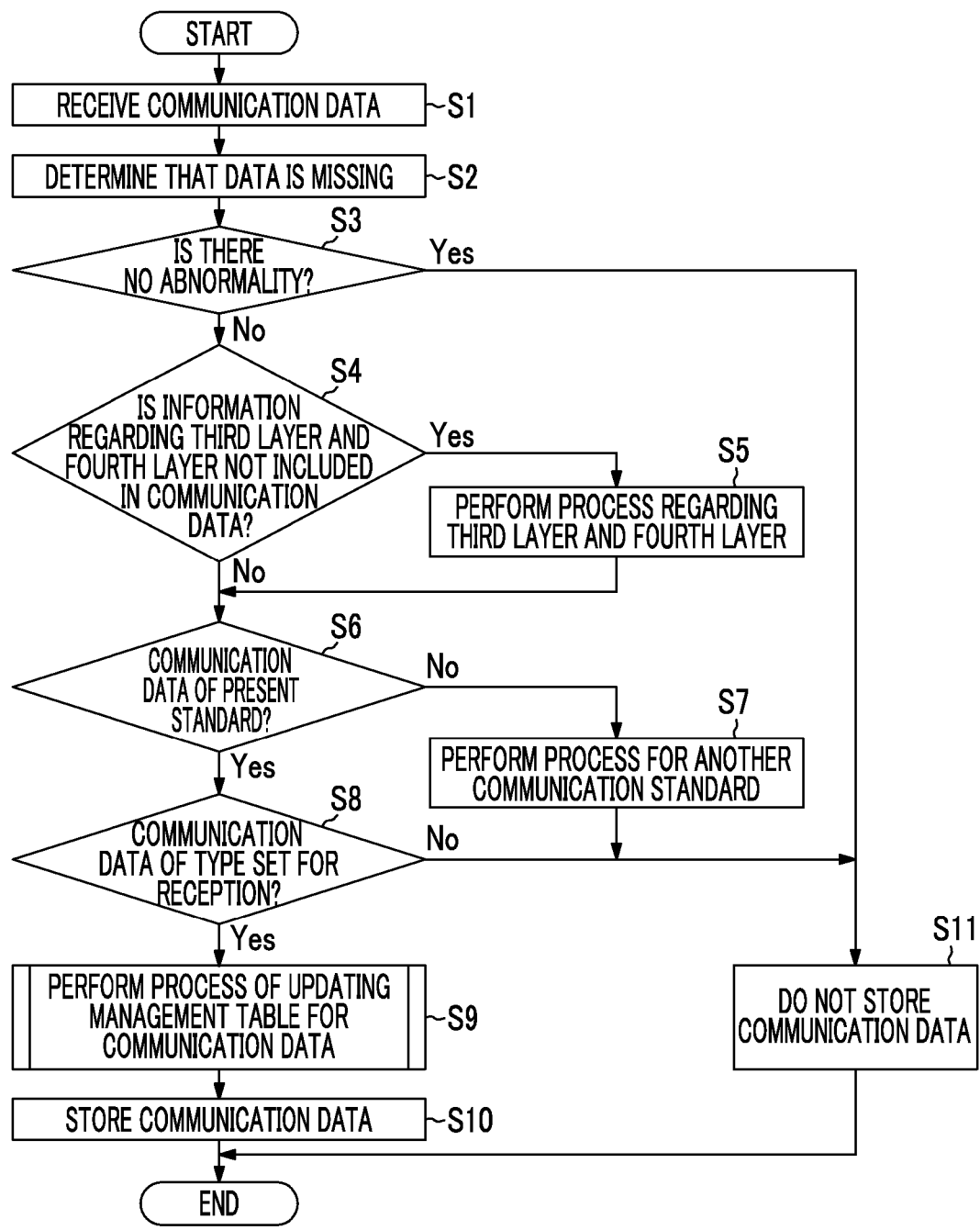
FIG. 4 is a flowchart of an example regarding an aircraft communication method according to the present embodiment.
Figure 5:
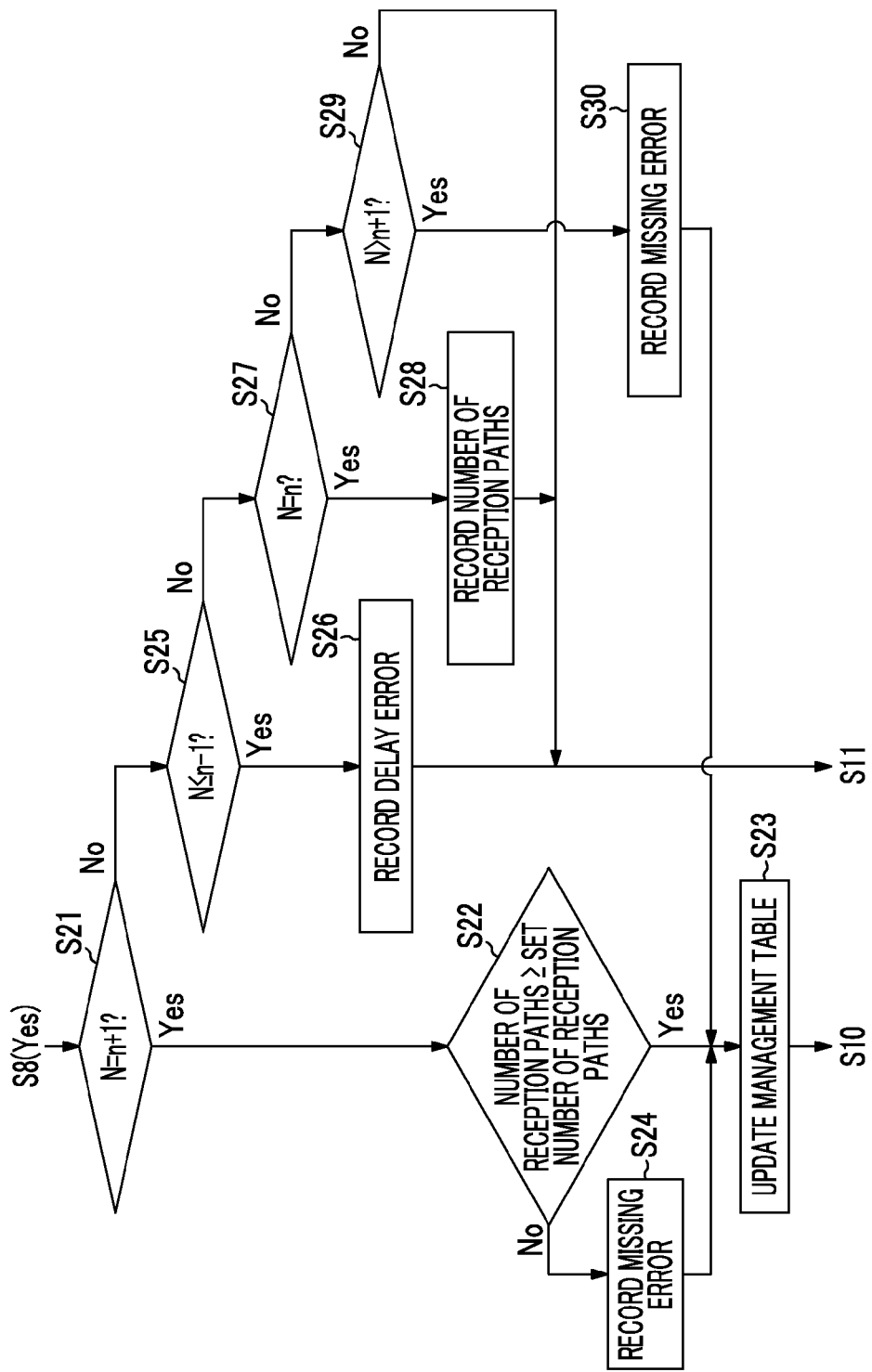
FIG. 5 is a flowchart of an example regarding an aircraft communication method according to the present embodiment.

Here, a control operation regarding the reception process of the communication processing unit 11 will be described with reference to FIGS. 4 and 5. FIG. 4 is a flowchart of an example regarding an aircraft communication method according to the present embodiment. FIG. 5 is a flowchart of an example regarding an aircraft communication method according to the present embodiment.

First, the communication processing unit 11 receives the communication data D (step S1: reception step). After the step S1, the communication processing unit 11 determines whether the communication data D has been destroyed based on the error detection code D7 included in the received communication data D (step S2). When the communication processing unit 11 determines that the communication data D has not been destroyed, the communication processing unit 11 determines no abnormality (step S3: Yes), and the process proceeds to step S4. On the other hand, when the communication processing unit 11 determines that the communication data D has been destroyed, the communication processing unit 11 determines abnormality (step S3: No), and the process proceeds to step S11 to be described below.

When the communication processing unit 11 determines that there is no abnormality in step S3, the communication processing unit 11 determines whether information regarding the network layer (third layer) and the transport layer (fourth layer) is included in a frame format of the communication data D (step S4). The communication processing unit 11 determines that the information regarding the third layer and the fourth layer are not included in the communication data D (step S4: Yes), and proceeds to step S6. On the other hand, the communication processing unit 11 determines that the information regarding the third layer and the fourth layer is included in the communication data D (step S4: No), the communication processing unit 11 executes the process regarding the third layer and the fourth layer (step S5), and then proceeds to step S6.

Subsequently, the communication processing unit 11 determines whether or not the communication data D has the present standard based on the standard identifier D2 included in the communication data D (step S6). When the communication processing unit 11 determines that the communication data D has the standard (step S6: Yes), the communication processing unit 11 determines whether the communication data is the type of the communication data D set in the configuration data for reception T based on the data type identifier D3 included in the communication data D (step S8). On the other hand, when the communication processing unit 11 determines that the communication data D does not have the present standard (step S6: No), the communication processing unit 11 performs a process for another communication standard (step S7), and then proceeds to step S11.

When the communication processing unit 11 determines that the communication data D is a predetermined type in step S8 (step S8: Yes), the communication processing unit 11 executes a process of updating a management table for managing the communication data D (step S9). Further, the process of updating a management table in step S9 will be described below. On the other hand, when the communication processing unit 11 determines that the communication data D is not a predetermined type in step S8 (step S8: No), the communication processing unit 11 proceeds to step S11.

In step S9, when the update process is executed, the communication processing unit 11 acquires and stores predetermined communication data D (step S10: data acquisition step), and ends the reception process. Meanwhile, when the communication processing unit 11 proceeds to step S11, the communication processing unit 11 ends the reception process without storing the received communication data D. Also, the communication processing unit 11 repeatedly performs such a reception process at an update period of the communication data D. Further, if the survival period D6 elapses, the non-stored communication data D is discarded.

Thus, the reception process includes receiving the communication data D in step S1 (reception step), determining whether the communication data D is to be acquired in steps S2 to S9 (acquisition determination step), and acquiring predetermined communication data D determined to be acquired in step S10 (data acquisition step).

Next, the process of updating the management table for the communication data D in step S9 will be described with reference to FIG. 5. Here, the management table used for the update process is stored in the communication processing unit 11. In this management table, the number of reception paths of the communication data D, the sequence number D5, and the survival period D6 are managed (registered and stored). When the communication processing unit 11 determines that the communication data D is a predetermined type in step S8 (step S8: Yes), the communication processing unit 11 determines whether the sequence number (here, N) of the received communication data D is the same as the sequence number obtained by adding an order (here, 1) to the sequence number (here, n) registered in the management table, that is, N=n+1 (step S21).

When the communication processing unit 11 determines that N=n+1 in step S21 (step S21: Yes), the communication processing unit 11 determines whether the number of reception paths registered in the management table (actual number of reception paths) is equal to or greater than the number of reception paths (set number of reception paths) set in the configuration data for reception (step S22). When the communication processing unit 11 determines that the number of reception paths registered in the management table is equal to or greater than the set number of reception paths (step S22: Yes), the communication processing unit 11 updates the management table (step S23). That is, the communication processing unit 11 updates the registered sequence number n in the management table with the sequence number N of the received communication data D, resets the registered number of reception paths, and resets the registered survival period D6. On the other hand, when the communication processing unit 11 determines that the number of reception paths that is registered in the management table is smaller than the set number of reception paths (step S22: No), the communication processing unit 11 determines that communication data D is missing, records a missing error (step S24), and proceeds to step S23. Further, during the execution of step S24, the communication processing unit 11 detects that there is abnormality in any one communication line 12 among the plurality of communication lines 12. Also, if the communication processing unit 11 ends the process of updating the management table in step S23, the communication processing unit 11 proceeds to step S10. Thus, the communication processing unit 11 determines whether the received communication data D is newer than previously received communication data D based on the sequence number included in the received communication data D, and acquires the communication data D is determined to be new.

On the other hand, when the communication processing unit 11 determines that N=n+1 is not satisfied in step S21 (step S21: No), the communication processing unit 11 determines whether N≤n−1 (step S25). When the communication processing unit 11 determines that the N n−1 (step S25: Yes), the communication processing unit 11 determines that the communication data D is delayed, records a delay error (step S26), and proceeds to step S11.

When the communication processing unit 11 determines that N≤n−1 is not satisfied in step S25 (step S25: No), the communication processing unit 11 determines whether N=n (step S27). When the communication processing unit 11 determines that N=n (step S27: Yes), the communication processing unit 11 determines that the communication data D having the same sequence number has been received, and counts up the number of reception paths in the management table to update the number of reception paths (step S28). After step S28, the communication processing unit 11 proceeds to step S11. Thus, when the communication processing unit 11 has received a plurality of pieces of communication data D having the same sequence number, the communication processing unit 11 stores the first received communication data D, and uses the communication data D received later for the update of the number of reception paths. Therefore, when the communication processing unit has received a plurality of pieces of communication data D having the same sequence number, the communication processing unit 11 acquires the first received communication data D as the communication data D.

When the communication processing unit 11 determines that N=n is not satisfied in step S27 (step S27: No), the communication processing unit 11 determines whether N>n+1 (step S29). When the communication processing unit determines that N>n+1 (step S29: Yes), the communication processing unit 11 determines that the communication data D is missing, records a missing error (step S30), and proceeds to step S23. That is, the communication processing unit 11 stores the communication data D having the latest sequence number in the management table even when the sequence number is missing. Further, when the communication processing unit 11 determines that N>n+1 is not satisfied (step S29: No), the communication processing unit 11 proceeds to step S11.

Figure 6:
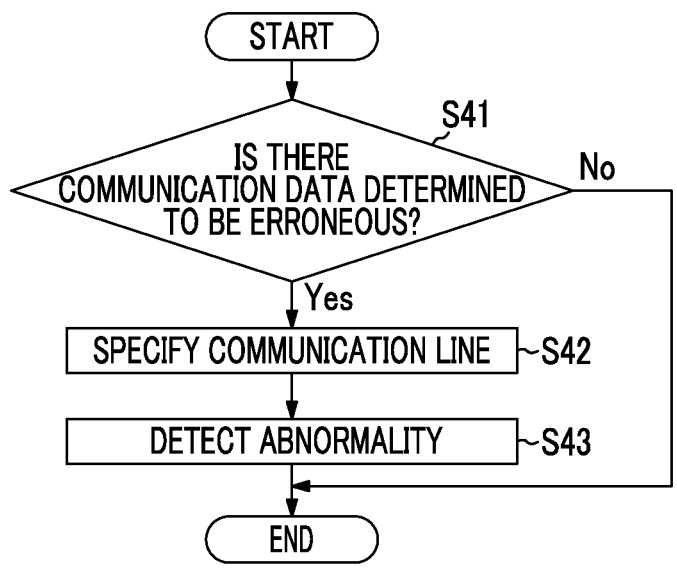
FIG. 6 is a flowchart of an example regarding an aircraft communication method according to the present embodiment.

Next, a control operation regarding an abnormality detection process of the communication processing unit 11 will be described with reference to FIG. 6. FIG. 6 is a flowchart of an example regarding an aircraft communication method according to the present embodiment. The abnormality detection process is a process of determining whether the plurality of communication lines 12 are abnormal. Further, it is preferable that, when the communication processing unit 11 specifies the abnormal communication line 12 from among the plurality of communication lines 12, the communication processing unit 11 attaches the communication line identifier D8 that is an identifier corresponding to the communication line 12 to the communication data D.

The communication processing unit 11 determines whether there is communication data D determined to be erroneous in the reception process (step S41). The error determination includes, for example, the missing error and the delay error described above. When the communication processing unit 11 determines that there is communication data D determined to be erroneous (step S41: Yes), the communication processing unit 11 specifies the communication line 12 based on the communication line identifier D8 attached to the communication data D (step S42). When the communication processing unit 11 specifies the communication line 12 in step S42, the communication processing unit 11 detects that a predetermined communication line 12 is abnormal (step S43), and then ends the abnormality detection process. On the other hand, when the communication processing unit 11 determines that there is no communication data D determined to be erroneous (step S41: No), the communication processing unit 11 ends the abnormality detection process. Also, the communication processing unit 11 repeatedly executes the abnormality detection process at a predetermined period.

Next, a control operation regarding the abnormality detection process for the device 5 connected to the communication processing unit 11 will be described. The device 5 requests the communication processing unit 11 to transmit the communication data D at a predetermined period in order to acquire, from the communication processing unit 11, the communication data D updated at a predetermined period in the communication processing unit 11. Here, when the device 5 cannot acquire the communication data D within the survival period D6 included in the communication data D, the device 5 detects that there is abnormality. That is, since the communication data D is discarded when the previously designated survival period D6 elapses, the device 5 cannot acquire the discarded communication data D, and in this case, the device 5 determines that there is abnormality in the communication processing unit 11 or the plurality of communication lines 12, and detects the abnormality.

Figure 7:
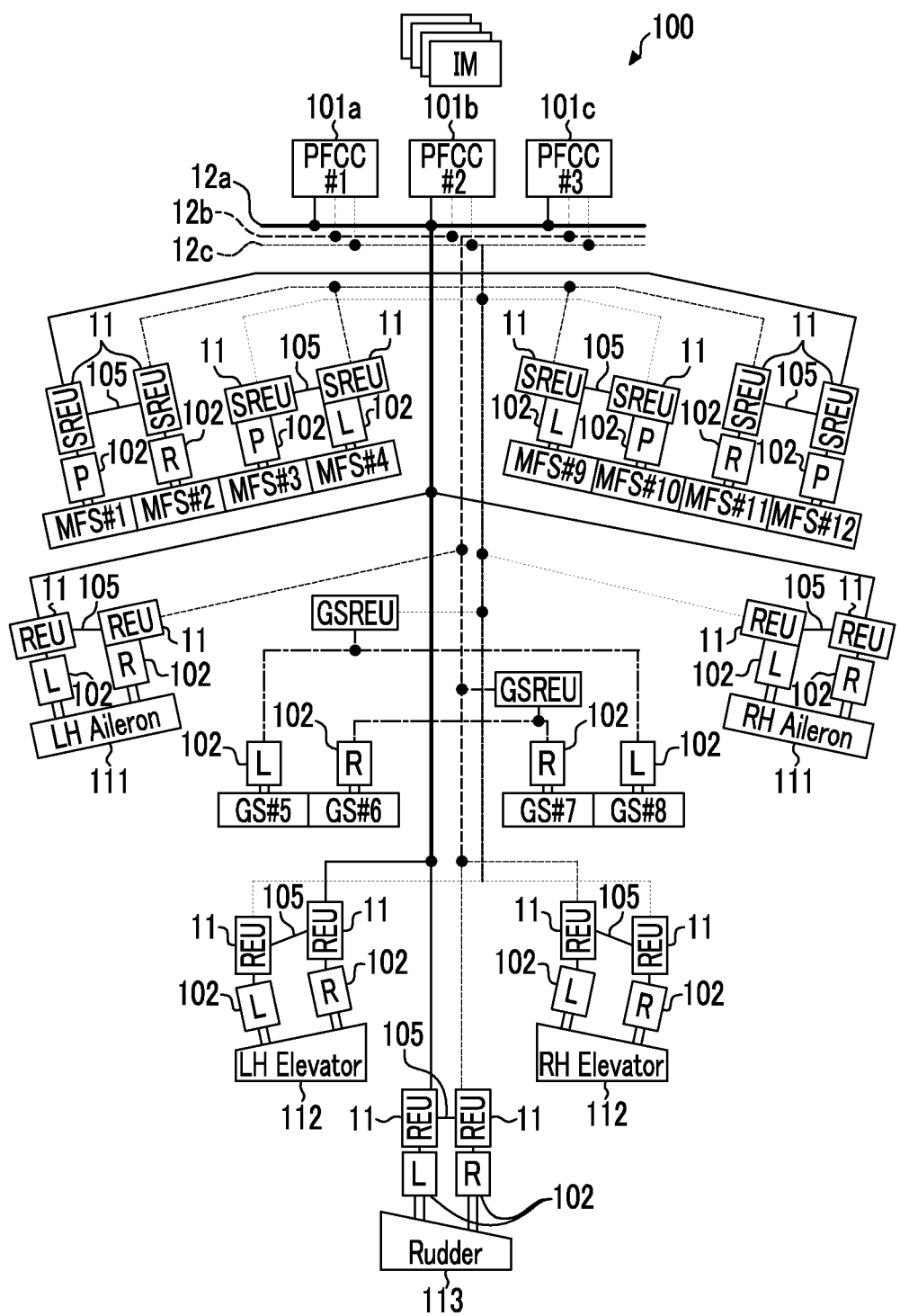
FIG. 7 is a block diagram of an example of an aircraft to which a communication system according to the present embodiment has been applied.
Figure 8:
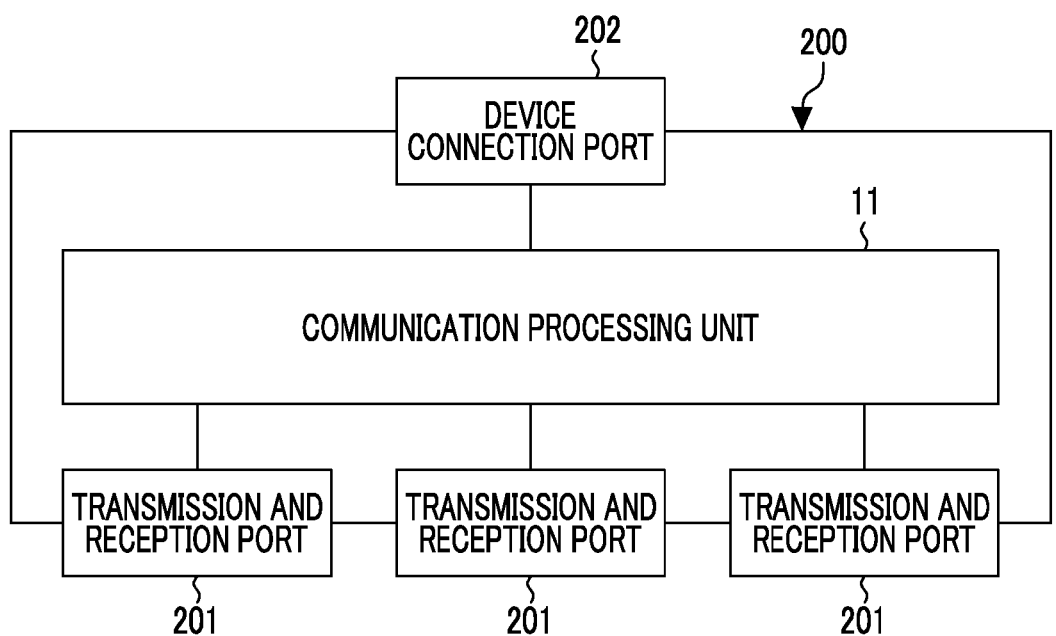
FIG. 8 is a schematic diagram of a communication device of the communication system according to the present embodiment.

Next, an example in which the communication system 1 described above has been applied to an aircraft 100 will be described with reference to FIGS. 7 and 8. FIG. 7 is a configuration diagram regarding an example of an aircraft to which the communication system according to the present embodiment has been applied. The aircraft 100 includes control surfaces such as multifunction spoilers MFSs on wing, ground spoilers GSs on wing, ailerons 111, elevators 112, and a rudder 113. Further, a plurality of devices 5 are mounted on the aircraft 100. A plurality of actuators 102 for driving the various control surfaces described above, a primary flight control device (PFCC: Primary Flight Control Computer) 101 for controlling the plurality of actuators 102, and an interface module IM, for example, are provided as the plurality of devices 5.

In such an aircraft 100, the communication system 1 includes a plurality of communication processing units 11 connected to a plurality of actuators 102, respectively, and three backbone bus lanes 12a, 12b, and 12c serving as communication lines connecting between the communication processing units 11.

Three primary flight control devices 101 are provided. Three primary flight control devices 101a, 101b, and 101c are respectively connected to the three backbone bus lanes 12a, 12b, and 12c. Further, a processing unit functioning as the communication processing unit 11 is provided in the three primary flight control devices 101a, 101b, and 101c.

Further, a plurality of communication processing units 11 are connected to the three backbone bus lanes 12a, 12b, and 12c, respectively. In this case, the different backbone bus lanes 12a, 12b, and 12c are connected to the adjacent communication processing units 11, and the respective adjacent communication processing units 11 are connected by a bus lane 105. Therefore, the communication processing unit 11 transmits and receives the communication data D via the backbone bus lanes 12a, 12b, and 12c and the bus lane 105 connected to the other adjacent communication processing unit 11, resulting in a dual redundant configuration. Thus, the communication system including the backbone bus lane 12 and the bus lane 105 is configured described above, and thus, it is possible to reduce wirings of communication lines.

Next, the communication processing unit 11 will be described with reference to FIG. 8. FIG. 8 is a schematic diagram of a communication device of the communication system according to the present embodiment. The communication processing unit 11 provided in the aircraft 100 is provided in a communication device 200 which is separate from the device 5. The communication device 200 includes the communication processing unit 11 provided therein, a plurality of transmission and reception ports (transmission and reception units) 201, and a device connection port 202. The plurality of transmission and reception ports 201 are connected to the backbone bus lanes 12a, 12b, and 12c, and the bus lane 105. The device connection port 202 is connected to the device 5, such as the actuator 102. Therefore, the communication system 1 has a configuration in which the device 5 can be physically disconnected from the communication device 200.

As described above, according to the configuration of this embodiment, the communication processing unit 11 can require necessary communication data D among the plurality of pieces of the received communication data D based on the various identifiers D2, D3, D4, and D8 included in the communication data D. In this case, redundancy is realized between the communication processing units 11 by the plurality of communication lines 12, and highly reliable communication data D is acquired from among the plurality of pieces of the communication data D, and thus, it is possible to secure the reliability of the communication data D. Further, since the communication line 12 is appropriately provided according to the degree of redundancy set in the device 5, and the communication line 12 and the communication processing unit 11 may be appropriately connected, it is possible to easily cope with the set degree of redundancy without affecting the device 5.

Further, according to the configuration of this embodiment, the communication processing unit 11 can acquire new communication data D. Therefore, the communication processing unit 11 becomes able to transmit the new acquired communication data D to the device 5, and thus, the device 5 can execute control without delay based on the communication data D.

Further, according to the configuration of this embodiment, the communication processing unit 11 can acquire the first received communication data D among the plurality of pieces of the communication data D determined to be new. Therefore, since the communication processing unit 11 can transmit the first received communication data D to the device 5, the device 5 can execute the control more rapidly based on the communication data D. Further, in the present embodiment, when the communication processing unit 11 receives a plurality of pieces of communication data D having the same sequence number, the communication processing unit 11 acquires the first received communication data D as the communication data D, but the present invention is not limited thereto. For example, when the communication processing unit 11 receives the plurality of pieces of communication data D having the same sequence number, the communication processing unit 11 may acquire matching communication data D as the communication data D among the plurality of pieces of the communication data D.

Further, according to the configuration of this embodiment, the communication processing unit 11 can detect the abnormality of the communication line 12 based on the communication data D. Therefore, it is possible to rapidly take appropriate measures to solve the abnormality of the communication line 12. Further, in the present embodiment, the abnormality of the communication line 12 is detected based on the communication line identifier D8 included in the communication data D, but the present invention is not limited to this configuration. For example, the communication line identifier D8 may be stored in the configuration data for reception T, and the communication processing unit 11 may detect the abnormality of the communication line 12 based on the communication line identifier D8 stored in the configuration data for reception T.

Further, according to the configuration of this embodiment, when the set number of reception paths is different from the actual number of reception paths, the communication processing unit 11 can detect that the communication line is abnormal. That is, if the actual number of reception paths is smaller than the set number of reception paths, the communication processing unit 11 can detect that there is abnormality in any one of the plurality of communication lines 12. Therefore, it is possible to rapidly take appropriate measures to solve the abnormality of the communication system. Further, it is possible to simplify the abnormality detection process as compared with the case in which the communication line identifier D8 is attached, and to suppress an increase in a control load regarding the abnormality detection process.

Further, according to the configuration of this embodiment, the communication processing unit 11 can acquire the non-destroyed communication data D. Therefore, the communication processing unit 11 transmits the acquired non-destroyed communication data D to the device 5, making it possible for the device 5 to accurately execute the control based on the communication data D.

Further, according to the configuration of this embodiment, the communication processing unit 11 can transmit the plurality of pieces of the communication data D to the plurality of communication lines 12. Therefore, the communication processing unit 11 can transmit the device status data D1 of the corresponding device 5 to the other communication processing unit 11.

Further, according to the configuration of this embodiment, when the device 5 does not acquire new communication data D in the survival period D6, the device 5 can detect abnormality. Therefore, it is possible to rapidly take appropriate measures to solve the abnormality of the communication system. Further, while, in the present embodiment, when the device 5 is unable to acquire the communication data D in the previously designated survival period D6, the device 5 has detected the abnormality, the present invention is not limited to this configuration, and the communication processing unit 11 may detect the abnormality. That is, when there is no reception of the communication data D in the survival period D6 included in the communication data D, the communication processing unit 11 may detect that there is the abnormality.

Further, according to the configuration of this embodiment, since the device 5 and the communication processing unit 11 can be separate, it is possible to clearly isolate the configuration of the device 5 and the configuration of the communication system 1. Further, since the communication device can be configured as a dedicated communication device 200 of the communication processing unit 11, it is possible to improve processing speed of the communication.

Further, the processing unit provided in the device 5 may function as the communication processing unit 11. That is, software (so-called middleware) capable of causing the processing unit to function as the communication processing unit 11 is caused to be executed by the processing unit of the device 5, and thus, the processing unit may be realized as the communication processing unit 11.

Further, according to the configuration of this embodiment, the communication processing unit 11 can receive a plurality of pieces of the communication data D in the reception process, the communication processing unit 11 can determine whether the communication data D is to be acquired in the acquisition determination process, and the communication processing unit 11 can acquire the necessary communication data D in the data acquisition process.

While the present invention has been applied as the communication system 1 of the aircraft in the present embodiment, the present invention may be applied to objects other than the aircraft as long as the communication system is multiple redundant, and the present invention is not particularly limited. Further, the plurality of communication lines 12 in this embodiment may be wired or may be wireless, and the present invention is not particularly limited.

REFERENCE SIGNS LIST 1 communication system
5 device
11 communication processing unit
12 communication line
100 aircraft
101 primary flight control device
102 actuator
105 bus lane
111 aileron
112 elevator
113 rudder
200 communication device
201 transmission and reception port
202 device connection port
D communication data
D1 device status data
D2 standard identifier
D3 data type identifier
D4 transmission source device identifier
D5 sequence number
D6 survival period
D7 error detection code
D8 communication line identifier
F1 data field
F2 field
F3 field
MFS multifunction spoiler
GS ground spoiler
IM interface module

The invention claimed is:

1. An aircraft communication system that performs communication between respective devices of an aircraft on which a plurality of devices are mounted,
wherein the plurality of devices have different degrees of redundancy,
the aircraft communication system comprises
a plurality of communication processing units provided corresponding to the plurality of devices; and
a plurality of communication lines connecting between the respective communication processing units according to the degree of redundancy of the device,
the plurality of communication processing units are able to perform bidirectional communication via the plurality of communication lines, and
each of the plurality of communication processing units
processes a plurality of pieces of communication data received from the plurality of communication lines connected according to the degree of redundancy, and generates a plurality of pieces of the communication data according to the plurality of communication lines connected according to the degree of redundancy, and
determines whether the plurality of pieces of received communication data are to be acquired based on identification information included in the plurality of pieces of received communication data when receiving the plurality of pieces of communication data from the plurality of communication lines, and acquires the communication data determined to be acquired.

2. The aircraft communication system according to claim 1,
wherein the communication data includes a sequence number that is information regarding order of the communication data, and
each of the plurality of communication processing units determines whether each piece of communication data is newer than previously received communication data based on the sequence number included in the received communication data, and acquires the communication data determined to be new.

3. The aircraft communication system according to claim 2,
wherein when each of the plurality of communication processing units receives a plurality of pieces of the communication data determined to be newer than the previously received communication data, each of the plurality of communication processing units acquires the first received communication data.

4. The aircraft communication system according to claim 1,
wherein the identification information included in the communication data or configuration data for reception stored in each of the plurality of communication processing units includes communication line identification information in which the communication data and the communication line are associated with each other, and
when there is communication data determined to be erroneous, each of the plurality of communication processing units detects that the communication line associated with the communication data determined to be erroneous is abnormal based on the communication line identification information.

5. The aircraft communication system according to claim 1,
wherein the communication data or configuration data for reception stored in each of the plurality of communication processing units includes information regarding set reception status in which reception status from the plurality of communication lines used for communication of the communication data has been set in advance, and
when the set reception status and actual reception status of the communication data from the plurality of communication lines are different, each of the plurality of communication processing units detects that there is abnormality.

6. The aircraft communication system according to claim 1,
wherein the communication data includes an error detection code for detecting whether the communication data has been destroyed, and
each of the plurality of communication processing units determines whether the plurality of received pieces of communication data have been destroyed based on the error detection code included in the plurality of pieces of the received communication data, and acquires the communication data determined not to have been destroyed.

7. The aircraft communication system according to claim 1,
wherein when each of the plurality of communication processing units receives device status data that is data regarding status of the device from each of the plurality of communication processing units, each of the plurality of communication processing units generates a plurality of pieces of the communication data including the identification information corresponding to the plurality of communication lines based on the received device status data, and transmits the plurality of generated pieces of the communication data to the plurality of communication lines.

8. The aircraft communication system according to claim 1,
wherein the communication data or the configuration data for reception stored in each of the plurality of communication processing units includes information regarding a survival period of the communication data, and
when each of the plurality of communication processing units or the device connected to each of the plurality of communication processing units does not acquire the communication data within the survival period, each of the plurality of communication processing units or the device detects that there is abnormality.

9. The aircraft communication system according to claim 1,
wherein each of the plurality of communication processing units is provided in the device.

10. The aircraft communication system according to claim 1,
wherein each of the plurality of communication processing units is provided in a separate communication device to be connected to the device.

11. An aircraft communication method using a communication system that performs communication between respective devices of an aircraft on which a plurality of devices are mounted,
wherein the plurality of devices have different degrees of redundancy,
the communication system includes
a plurality of communication processing units provided corresponding to the plurality of devices; and
a plurality of communication lines connecting between respective communication processing units of the plurality of communication processing units according to the degree of redundancy of the device, each of the plurality of communication processing units are able to perform bidirectional communication via the plurality of communication lines, each of the plurality of communication processing units processes a plurality of pieces of communication data received from the plurality of communication lines connected according to the degree of redundancy, and generates a plurality of pieces of the communication data according to the plurality of communication lines connected according to the degree of redundancy, and the aircraft communication method includes:

a reception process of receiving, by a first communication processing unit of the plurality of communication processing units, a plurality of pieces of communication data from a second communication processing unit of the plurality of communication processing units via the plurality of communication lines;

an acquisition determination process of determining, by the first communication processing unit, whether the plurality of pieces of received communication data are to be acquired based on identification information included in the plurality of pieces of received communication data; and a data acquisition process of acquiring, by each of the plurality of communication processing units, the communication data determined to be acquired.

12. A communication device provided in a communication system that performs communication between respective devices of an aircraft on which a plurality of devices are mounted, wherein the plurality of devices have different degrees of redundancy, the communication device comprises:

a plurality of transmission and reception units to which a plurality of communication lines are connected according to the degree of redundancy of the device, and that are able to bidirectionally transmit and receive communication data between the plurality of communication lines; and a communication processing unit connected to the plurality of transmission and reception units, and processing the communication data, and the communication processing unit processes a plurality of pieces of communication data received from the plurality of communication lines connected according to the degree of redundancy, and generates a plurality of pieces of the communication data according to the plurality of communication lines connected according to the degree of redundancy, and determines whether the plurality of pieces of received communication data are to be acquired based on identification information included in the plurality of pieces of received communication data when receiving the plurality of pieces of communication data from the plurality of communication lines via the plurality of communication lines, and acquires the communication data determined to be acquired.

* * * * *